US011484946B2

(12) United States Patent
Kuester et al.

(10) Patent No.: US 11,484,946 B2
(45) Date of Patent: Nov. 1, 2022

(54) DEFINING A TRANSITION ZONE BETWEEN A SHELL AND LATTICE CELL ARRAY IN A THREE-DIMENSIONAL PRINTING SYSTEM

(71) Applicant: 3D Systems, Inc., Rock Hill, SC (US)

(72) Inventors: Evan Kuester, Del Mar, CA (US); Patrick Dunne, Lafayette, CA (US)

(73) Assignee: 3D SYSTEMS, INC., Rockhill, SC (US)

( * ) Notice: Subject to any disclaimer, the term of this patent is extended or adjusted under 35 U.S.C. 154(b) by 609 days.

(21) Appl. No.: 16/587,637

(22) Filed: Sep. 30, 2019

(65) Prior Publication Data

US 2020/0108442 A1  Apr. 9, 2020

Related U.S. Application Data

(60) Provisional application No. 62/743,179, filed on Oct. 9, 2018.

(51) Int. Cl.
*B33Y 50/02* (2015.01)
*B22F 12/00* (2021.01)
(Continued)

(52) U.S. Cl.
CPC ............ *B22F 12/00* (2021.01); *B22F 1/0003* (2013.01); *B29C 64/386* (2017.08);
(Continued)

(58) Field of Classification Search
None
See application file for complete search history.

(56) References Cited

U.S. PATENT DOCUMENTS

| 5,526,340 A | 6/1996 | Tanala |
| 5,595,703 A | 1/1997 | Swaelens et al. |

(Continued)

FOREIGN PATENT DOCUMENTS

| JP | 2005-171299 | 6/2005 |
| WO | 2016113212 | 7/2016 |

OTHER PUBLICATIONS

Marco Livesu et al.: "From 3D models to 3D prints: an overview of the processing pipeline". Computer Graphics Forum, vol. 36, No. 2, May 23, 2017 (May 23, 2017), pp. 537-654, XP055393619, GB, ISSN: 0167-7055, DOI: 10.111/cgf.13147 Section 3.3 "Support Structures".

(Continued)

*Primary Examiner* — Joni Hsu

(57) ABSTRACT

An apparatus for manufacturing a three-dimensional article by additive manufacturing includes a processor and an information storage device storing software instructions. In response to execution by the processor, the software instructions cause the apparatus to: receive initial data defining the three-dimensional article having an outer surface, define a shell having the outer surface of the three-dimensional article and an opposing inner surface that defines an inner cavity, define a transition zone between the inner surface of the shell and a boundary that is inside the inner cavity and generally follows the inner surface of the shell, define a lattice of arrayed unit cells that fill the inside of the boundary, the lattice is defined by connected lattice segments, and define transition segments that couple the lattice to the inner surface of the shell.

12 Claims, 15 Drawing Sheets

(51) Int. Cl.
| | |
|---|---|
| *G05B 19/4093* | (2006.01) |
| *B22F 1/00* | (2022.01) |
| *G06F 15/78* | (2006.01) |
| *G05B 19/409* | (2006.01) |
| *B29C 64/386* | (2017.01) |
| *B33Y 70/00* | (2020.01) |
| *B33Y 10/00* | (2015.01) |
| *B33Y 30/00* | (2015.01) |
| *B22F 10/10* | (2021.01) |
| *G06F 113/10* | (2020.01) |

(52) U.S. Cl.
CPC ....... *G05B 19/409* (2013.01); *G05B 19/4093* (2013.01); *G06F 15/7839* (2013.01); *B22F 10/10* (2021.01); *B22F 2998/10* (2013.01); *B22F 2999/00* (2013.01); *B33Y 10/00* (2014.12); *B33Y 30/00* (2014.12); *B33Y 50/02* (2014.12); *B33Y 70/00* (2014.12); *G05B 2219/49007* (2013.01); *G06F 2113/10* (2020.01)

(56) References Cited

U.S. PATENT DOCUMENTS

| | | |
|---|---|---|
| 5,855,718 A | 1/1999 | Nguyen et al. |
| 5,965,079 A | 10/1999 | Manners |
| 6,110,602 A | 8/2000 | Dickens et al. |
| 6,261,506 B1 | 7/2001 | Nguyen et al. |
| 6,309,581 B1 | 10/2001 | Gerrasi |
| 8,960,844 B2 | 2/2015 | Nakano et al. |
| 9,183,325 B2 | 11/2015 | Wighton et al. |
| 2011/0205583 A1* | 8/2011 | Young .................. B29C 64/386 358/1.15 |
| 2014/0316549 A1 | 10/2014 | Zenere |
| 2015/0066178 A1* | 3/2015 | Stava .................... B29C 64/40 700/98 |
| 2015/0193559 A1* | 7/2015 | Musuvathy ............. G06F 30/17 703/1 |
| 2019/0009464 A1* | 1/2019 | Steege .................. B33Y 10/00 |

OTHER PUBLICATIONS

Sara McMains et al.: "Layered Manufacturing of Thin-Walled Parts," Proceedings of DETC2000, Sep. 10, 2000 (Sep. 10, 2000), pp. 1-9 XP055508078, Retrieved from the Internet: URL: http://citeseerx.ist.psu.edu/viewdoc/download?doi=10.1.1.2.1578&rep=rep1&type=pdf [retrieved on Sep. 19, 2018] the whole document.
Ondrej Stava et al.: "Stress Relief: Improving Structural Strength of 3D Printable Objects", ACM Transactions on Graphics (TOG), vol. 31, No. 4, Jul. 1, 2012 (Jul. 1, 2012), pp. 1-11, XP055391176, US, ISSN: 0730-0301, DOI: 10.1145/2185520.2184433 Sections 4.4, 5.; figure 15.

* cited by examiner

DEFINING A TRANSITION ZONE BETWEEN A SHELL AND LATTICE CELL ARRAY IN A THREE-DIMENSIONAL PRINTING SYSTEM

CROSS-REFERENCE TO RELATED APPLICATIONS

This non-provisional patent application claims priority to U.S. Provisional Application Ser. No. 62/743,179, Entitled "Defining a Transition Zone Between a Shell and Lattice Cell Array in a Three-Dimensional Printing System" by Evan Kuester et al., filed on Oct. 9, 2018, incorporated herein by reference under the benefit of U.S.C. 119(e).

FIELD OF THE INVENTION

The present disclosure generally concerns an apparatus and method for the digital fabrication of three dimensional articles of manufacture. More particularly, the present disclosure concerns a way of providing a transition zone between a lattice and a shell that does not trap unsolidified material and provides a functional support for the shell.

BACKGROUND

Three-dimensional manufacturing systems are in widespread use. Examples of three dimensional printer technologies includes stereolithography, selective laser sintering, and fused deposition modeling to name a few. Some of these printer technologies are used for a precursor for investment casting and involve the manufacturing of a "sacrificial" article. Challenges with this include providing good support to maintain accurate geometries while minimizing unsolidified material that may adversely removal of the sacrificial material.

SUMMARY

Figure 1:
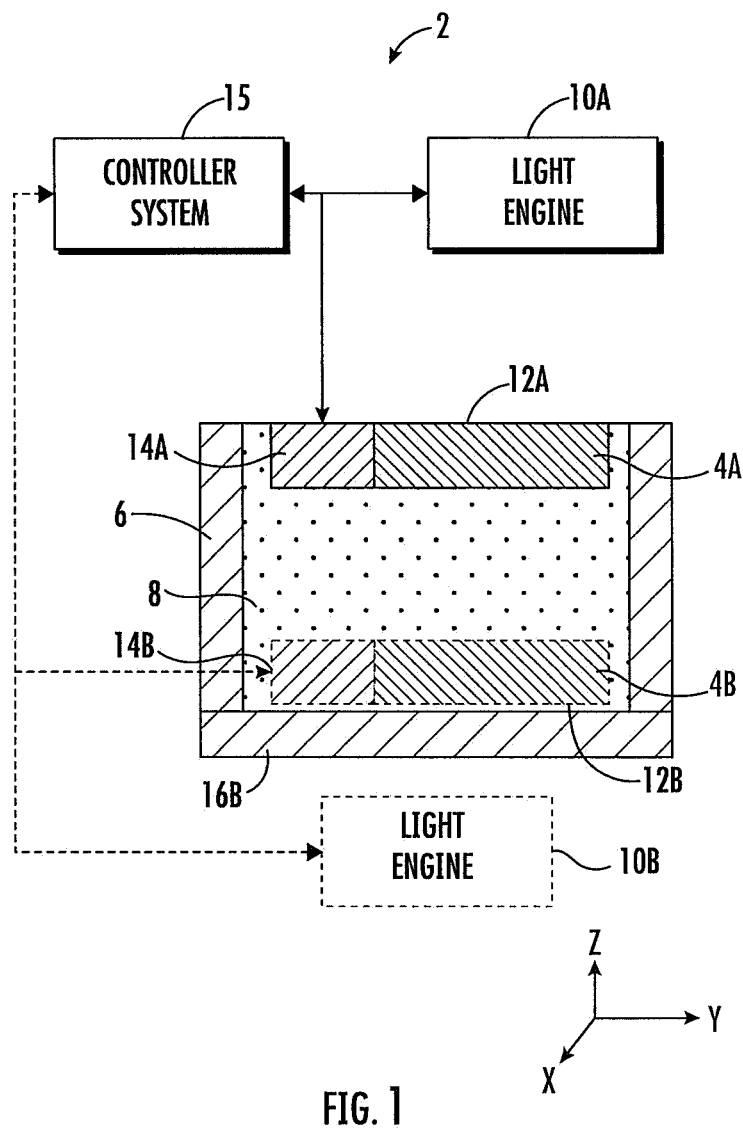
FIG. 1 is a schematic block diagram of an embodiment of a three-dimensional printing system for printing an article including a shell with an internal lattice structure.

In a first aspect of the disclosure, an apparatus for manufacturing a three-dimensional article by additive manufacturing includes a processor and an information storage device. The information storage device includes a non-transient or non-volatile device storing software instructions. In response to execution by the processor, the software instructions cause the apparatus to: receive initial data defining the three-dimensional article having an outer surface, define a shell having the outer surface of the three-dimensional article and an opposing inner surface that defines an inner cavity, define a transition zone between the inner surface of the shell and a boundary that is inside the inner cavity and generally follows the inner surface of the shell, define a lattice of arrayed unit cells that fill the inside of the boundary, the lattice is defined by connected lattice segments, and define transition segments that couple the lattice to the inner surface of the shell, the transition segments are generally oriented more toward a normal to the inner surface of the shell relative to the lattice segments.

The three-dimensional article so defined can include the shell defining the outer surface and the internal cavity as well as the (regular) lattice that fills the cavity. The term "regular lattice" is defined as a lattice having repeated and generally identical units that fill a three-dimensional space. Having the transition segments being generally perpendicular to the inner surface of the shell facilitates better draining of resin from the shell and provides a uniform strength of lattice support that does not vary with position.

In one implementation defining the shell includes offsetting the outer surface of the three-dimensional body inwardly to define the shell.

In another implementation the lattice is a repeating arrangement of unit cells that are individually one of cubic, hexagonal, rhombohedral, triclinic, monoclinic, tetrahedral, and shortened tetrahedral.

In yet another implementation the lattice segments are individually formed by a pair of intersecting sheets. The intersecting sheets can have parallel edges along a major axis. The intersection of the sheets can be parallel to the major axis and can bisect a distance between the parallel edges. A length of a sheet along the major axis can be in a range of about 2 to 5 millimeters. A width of a sheet along an intermediate axis can be in a range of about 0.5 to 1.0 millimeters. A thickness of a sheet can be about 50 to 100 microns.

In a further implementation a mesh cage is defined at the boundary between the transition zone and the lattice. The mesh cage directly couples to the lattice and to the transition segments. The mesh cage decouples lattice connection points (to the cage) from transition segment connection points (to the cage). This allows for greater flexibility in defining a density, spacing, and location of the transition segments. Note that a connection point or location is defined in this context as an intersection between a structure like a lattice or segment and the mesh.

In a yet further implementation the transition segments directly couple to the lattice (without an intermediary cage).

In a second aspect of the disclosure, a method of defining a supported shell for manufacturing a three-dimensional article includes receiving initial data defining the three-dimensional article having an outer surface, defining a shell having the outer surface of the three-dimensional article and an opposing inner surface that defines an inner cavity, defining a transition zone between the inner surface of the shell and a boundary that is inside the inner cavity and generally follows the inner surface of the shell, defining a lattice of arrayed unit cells that fill the inside of the boundary, the lattice is defined by connected lattice segments, and defining transition segments that couple the lattice to the inner surface of the shell, the transition segments are generally oriented more toward a normal to the inner surface of the shell relative to the lattice segments.

In one implementation, the three-dimensional article is a metal article. Defining the shell, transition zone, lattice, and transition segments defines a precursory (sacrificial) article. The precursory article includes the shell with an outer surface and an internal structure supporting the shell. The internal structure includes the lattice and transition segments. A three-dimensional printer is used to print the precursory article. After printing, the outer surface of the precursory article is coated with a "green" material such as a ceramic powder in an organic binder. The green material is then heated with a first temperature profile to burn out the binder to burn out the precursory article. After the first temperature profile is applied, the green material is heated with a second temperature profile to "fire" or sinter the ceramic powder. The result is a hollow ceramic mold having an inside surface that corresponds to the outer surface of the now burned-out shell. Molten metal is then poured into the mold. The metal is allowed to cool. After the metal has cooled, the ceramic is broken away from the metal to provide the metal article.

The apparatus and method described above have advantages for forming cast metal articles. (1) The transition segments being generally perpendicular to the inside surface of the shell facilitate draining of uncured resin from within the shell. (2) The transition segments having a consistent orientation with respect to the inside surface provide a consistent level of support for the shell and provide a better dimensional accuracy of the shell. (3) The lattice structure with intersecting lattice segments minimizes use of polymer material. During the burn-out process, this minimizes residue and potential damage to the ceramic.

DETAILED DESCRIPTION OF THE PREFERRED EMBODIMENTS

FIG. 1 is a schematic block diagram of an embodiment of a three-dimensional printing system or apparatus 2 for fabricating a three-dimensional article 4A or 4B (or article 4 generically). The three-dimensional article 4A or 4B can be a supported shell to be used as part of a manufacturing process (i.e., method 170 of FIG. 16) for forming a metal article. In describing the following figures, mutually perpendicular axes X, Y, and Z will be used. Axes X and Y are lateral axes that are horizontal or generally horizontal. Axis Z is a vertical axis that is generally aligned with a gravitational reference. The direction +Z is generally upward and the direction −Z is generally downward. The term "gener-ally" indicates that a direction or magnitude is by design but not exact such as to within manufacturing tolerances.

FIG. 1 schematically illustrates two embodiments of apparatus 2. Certain element numbers ending in "A" indicate a first embodiment of apparatus 2. Those ending in "B" indicate a second embodiment of apparatus 2. Those elements not ending in A or B are common to both embodiments. Apparatus 2 includes a resin vessel 6 containing a liquid photocurable resin 8.

For the first embodiment (A): Disposed above the resin vessel 6 is a light engine 10A. In one embodiment, the light engine 10A includes a laser light source and scanning optics to allow a laser beam to scan across a top surface of the resin 8 to selectively harden layers of resin 8 onto a upper surface 12A of the three-dimensional article 4A.

A positioning mechanism 14A is configured to vertically position the three-dimensional article 4A. The positioning mechanism 14A includes a platform (not shown) with a top surface for supporting the three-dimensional article 4A. The light engine 10A and the positioning mechanism 14A are coupled to and under control of a controller system 15.

The controller system 15 (or controller 15) includes a processor coupled to a computer-readable storage medium. The computer-readable storage medium includes a non-transitory or non-volatile storage medium storing computer-readable program code portions (i.e., software instructions) stored therein. In response to execution by the processor, the software instructions cause the processor to control the light engine 10A or 10B, the positioning mechanism 14A or 14B, and other portions of the apparatus 2 as well as to perform other functions. The other functions include processing incoming data as will be described infra including with respect to figures that follow. The controller system 15 can be located at one portion within apparatus 2 or have multiple different portions within, peripheral to, or external to apparatus 2. Different portions of controller system 14 can operate concurrently, sequentially, or at different times asynchronously.

According to the first (A) embodiment of apparatus 2, the controller 15 operates the light engine 10A and positioning mechanism 14A to perform the following steps: (1) The upper surface 12A is positioned vertically. (2) A layer of resin 8 is disposed over the upper surface 12A. (3) The light engine 10A (i.e., laser) is operated to selectively harden a layer of the resin 8 onto the upper surface 12A. The laser 10A scans laterally (along X and Y over a build plane that is proximate to the upper surface 12A) and hardens lines of resin 8 as it scans. The scan speed, laser beam cross-sectional geometry, and laser intensity determines a lateral line width. The line width may be varied according to the invention to optimize a thickness of "semi-rectangular" sheet structures as will be described infra. (4) Steps (1)-(3) are repeated until the three-dimensional article 4A is formed.

The second (B) embodiment of the apparatus 2 includes light engine 10B that is disposed below resin vessel 6. Light engine 10B can includes a light source and a light modulator. The light modulator can include a micro-mirror array. The resin vessel 6 includes a transparent lower portion 16B. The light engine 10B projects light up through the transparent lower portion 16B and to a build plane that is proximate to a lower surface 12B.

A positioning mechanism 14B is configured to position the three-dimensional article 4B vertically. The positioning mechanism can include a downward-facing surface that supports the three-dimensional article 4B. The light engine 10B and positioning mechanism 12B are coupled to and under control of controller 15.

According to the second (B) embodiment of apparatus 2, the controller operates the light engine 10B and positioning mechanism 14B to perform the following steps: (1) The lower surface 12B is positioned vertically proximate to the build plane. (2) The light engine 10B is operated to selectively harden a layer of resin 8 onto the lower surface 12B. (3) Steps (1) and (2) are repeated until the three-dimensional article 4B is formed.

According to an illustrative embodiment that is later described in FIG. 16, the article 4 is a precursory article 4. This is because precursory article 4 is to be used for defining a ceramic mold. A metal article can then be formed using the ceramic mold. The metal article would generally have the same geometry as the precursory article 4.

Figure 2:
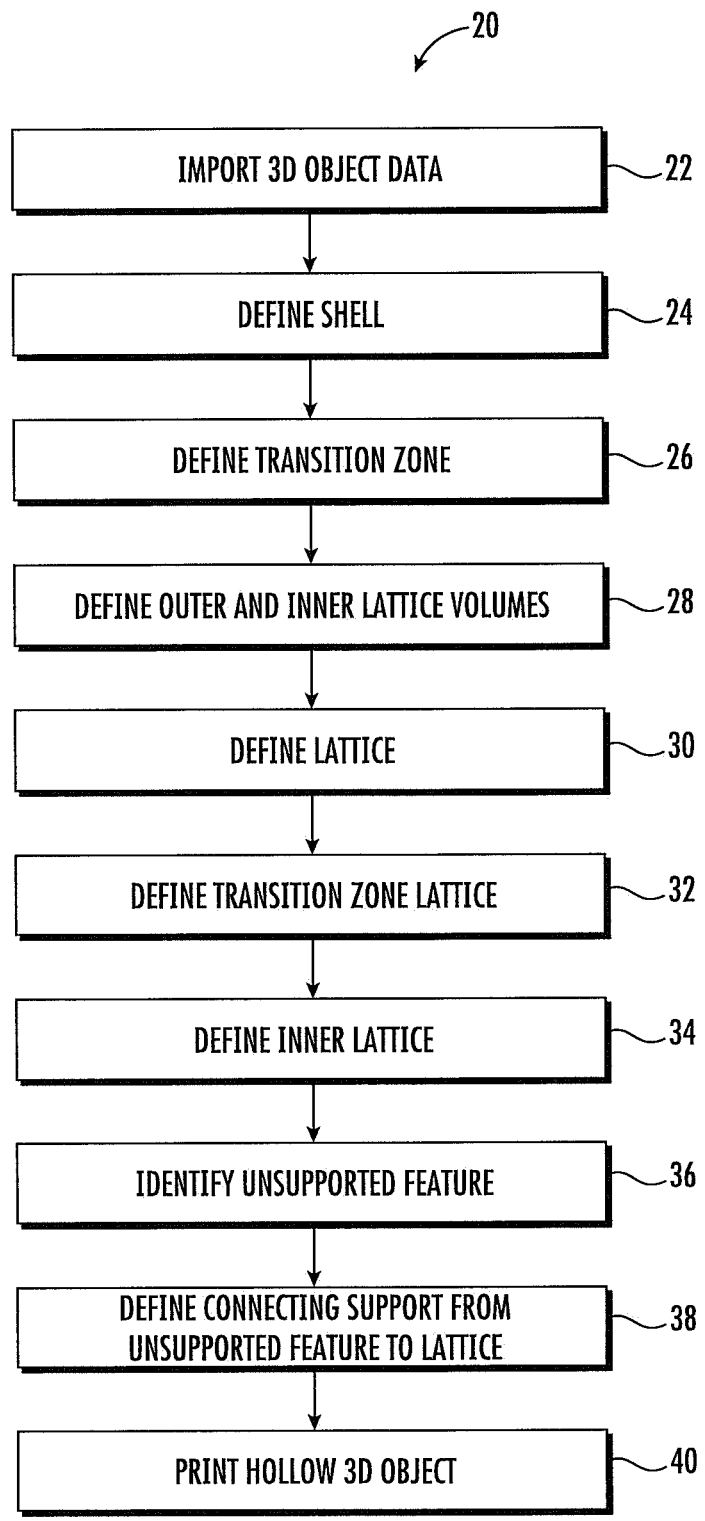
FIG. 2 is a flowchart depicting embodiments of a method of defining and printing an article.
Figure 3:
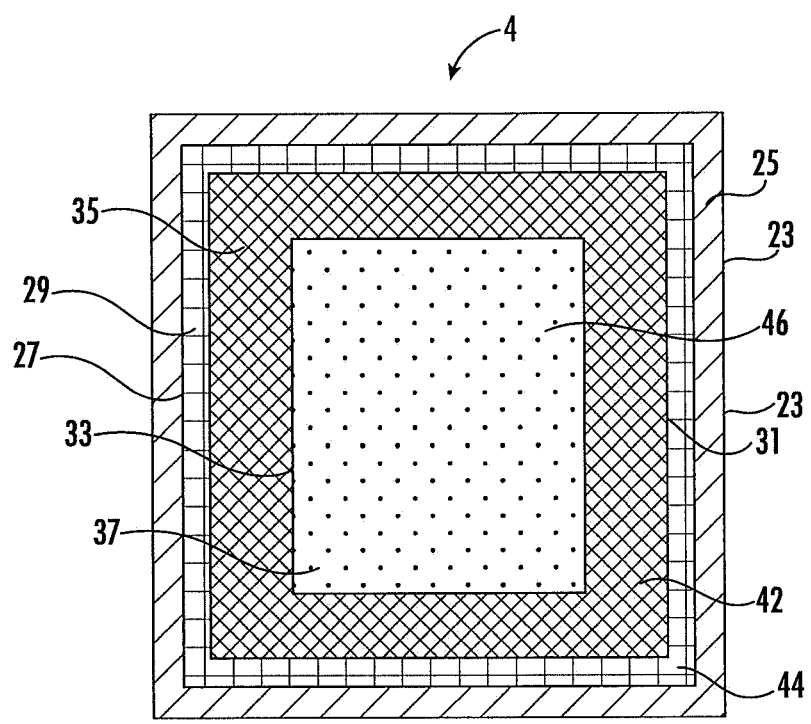
FIG. 3 is a diagram depicting an article formed by an embodiment of a method from FIG. 2.

FIG. 2 is a flowchart depicting embodiments of a method 20 for defining article 4. Method 20 particularly focuses on "defining" print data that can be used for a print process which was previously described with respect to FIG. 2. The method 20 defines a mostly hollow article 4 as depicted in FIG. 3. As steps of method 20 are described, portions of FIG. 3 will be referred to as an illustration. Method 20 is illustrated as including steps 22-40 in FIG. 2. It is to be noted that in some embodiments, method 20 may include a subset of the illustrated steps 22-40 and that the steps may be performed in any acceptable sequence that results in a desired hollow article 4. The steps of method 20 are performed by controller system 15.

According to 22, 3D object data is received by controller 15. The object data may be intended to define a precursory article 4 with an outer surface 23. As the following is described, refer to FIG. 3.

According to 24, a shell 25 is defined. The shell 25 will have an outer surface 23 matching that of the precursory article 4 and an opposing inner surface 27. A shell thickness is defined as a distance from the outer surface 23 to the inner surface 27. For some applications, the shell thickness can vary between about 0.5 millimeter to 1.0 millimeter.

According to 26, a transition zone 29 is defined. The transition zone 29 is defined between the inner surface 27 of the shell 25 and an outer boundary 31 that generally follows the inner surface 27.

According to 28, an inner boundary 33 is defined inside the outer boundary 31. An outer lattice volume 35 is defined between the outer 31 and inner 33 boundaries. An inner volume 37 is defined inside the inner boundary 33.

According to 30, a lattice structure 42 is defined to fill the outer lattice volume 35. According to 32, a transition zone lattice 44 is defined to couple the lattice structure 42 to the inner surface 27 of the shell 25. The transition zone lattice 44 can be optimized to allow liquid resin to drain from inside the shell 25 along the inner surface 27.

According to 34, an inner lattice 46 is defined to fill the inner volume 37. Generally speaking, the inner lattice 46 has a lower density of hardened material per unit volume than the outer lattice 42. In one embodiment, the inner lattice 46 has a larger unit cell pitch than the outer lattice 42. In another embodiment, the inner volume 37 is a void without any hardened material.

According to 36, an unsupported feature or portion of the shell 25 is identified. In one embodiment, such an unsupported feature is a downward-hanging portion of shell 25. According to 38, a support is defined that couples the unsupported feature to the lattice 42 or 44. According to 40, the apparatus 2 prints the precursory article 4.

As indicated earlier, method 20 can include a subset of the illustrated steps 22-40. In a first alternative method 20, steps 22, 24, 30, and 40 are included with the remainder of 22-40 not included. In this embodiment, the lattice 42 fills an entire space within the shell 25.

In a second embodiment, method 20 includes steps 22, 24, 26, 30, 32, and 40 with the remainder of 22-40 not included. In the second embodiment, there is no inner lattice volume or sparse lattice.

In a third embodiment, method 20 includes steps 22, 24, 28, 30, 34, and 40 with the remainder of 22-40 not included.

In a fourth embodiment, method 20 includes steps 22, 24, 30, 36, 38, and 40 with the remainder of 22-40 not included.

In a fifth embodiment, method 20 includes steps 20, 24, 28, 30, 34, 36, and 40 with the remainder of 22-40 not included.

The order of steps for method 20 can also vary. There are various reasons for including different combinations.

For example, with a relatively thin shell structure, there may be no advantage to including steps 28 and 34. In some instances, the transition zone may be used to eliminate the need for steps 36 and 38. These are but a few examples that can depend on the geometry of the three-dimensional article being manufactured.

In a typical embodiment, step 24 will include the formation of a drain at the bottom of shell 25 and a vent at the top of shell 25. The drain may include a plurality of drain features. The location(s) of the drain(s) would be based upon the internal geometry of the article 4 to provide complete and rapid drainage of uncured photocurable resin 8.

Figure 4:
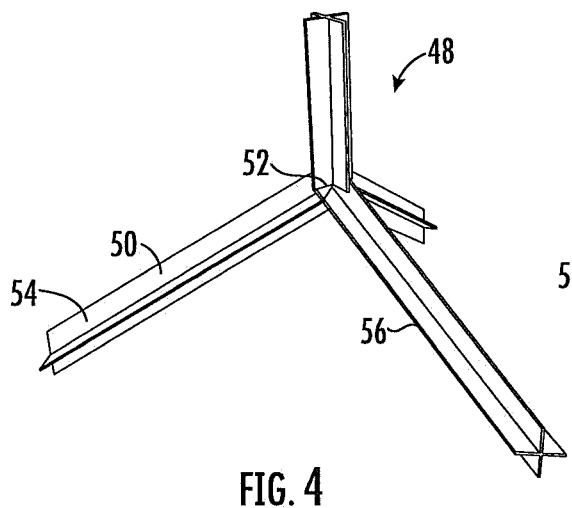
FIG. 4 depicts an embodiment of a unit cell made up of connected segments.
Figure 4A:
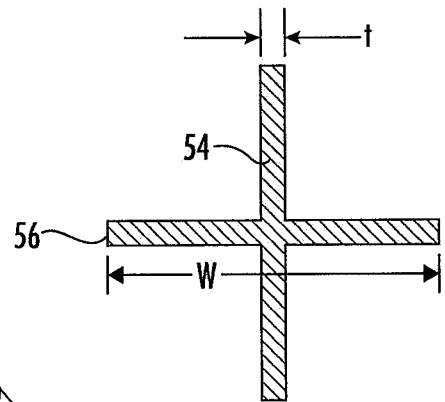
FIG. 4A depicts a cross section of a segment.
Figure 5:
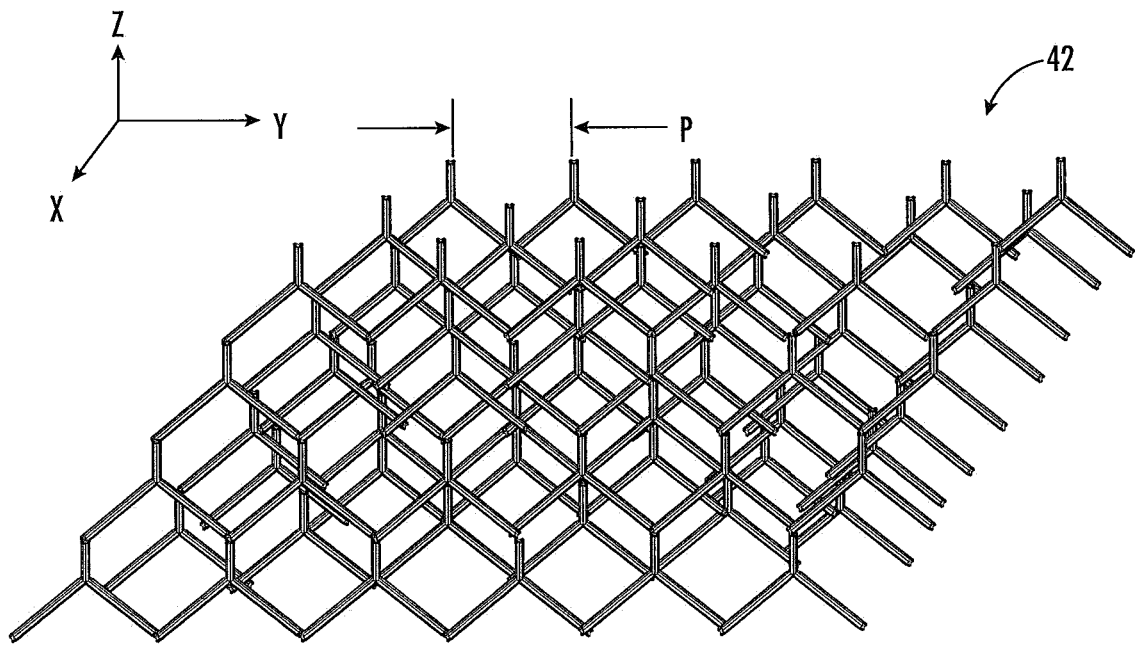
FIG. 5 depicts an embodiment of a lattice that is a three-dimensional array of unit cells.

FIGS. 4, 4A, and 5 depict aspects of an embodiment of a three-dimensional lattice 42. Lattice 42 is an array of individual unit cells 48. FIG. 4 depicts a tetrahedral unit cell 48. The unit cell 48 is composed of segments 50. In the illustrated embodiment, the unit cell 48 includes four linear segments 50 that meet a central node 52.

The segments 50 individually are formed by two nearly rectangular sheets 54. The sheets 54 individually have parallel edges 56 along their major axes. Each sheet has a width w along an intermediate axis and a thickness t along a minor axis. The illustrated structure of segments 50 has advantages. This allows for a strong lattice 42 with a minimal use of material for forming the lattice 42.

In the illustrated embodiment unit cell 48 is approximately tetrahedral so that an internal angle between each pair of segments 50 is about 109.5 degrees. In the illustrated embodiment, there is one segment 50 that is parallel with vertical axis Z and three segments 50 that define oblique angles with respect to axes X, Y, and Z. In the illustrated embodiment the vertical segment 50 may be shorter than the other three segments 50 so that the lattice 42 is not exactly a diamond lattice 42.

Various lattices 42 can be used such as cubic, hexagonal, rhombohedral, triclinic, monoclinic, tetrahedral, and shortened tetrahedral, to name a few examples. The particular lattice 42 selected may depend upon factors such as material efficiency and an ability to drain resin from the lattice 42.

Lattice 42 dimensions can vary. A three-dimensional lattice pitch P or $P_x$ $P_y$, and $P_z$ can be defined along axes X, Y, and Z respectively. A pitch $P_y$ along Y is illustrated in FIG. 5. In illustrative embodiments, P can be in a range of about 2 to 5 millimeters or about 3 to 4 millimeters. A length of a segment 50 along its major axis can be in a range of about 2 to 5 millimeters long. Sheets 54 can be about 0.5 to 1.0 millimeters wide (w). Sheets 54 can be about 50 to 100 microns or about 75 microns thick. All of these dimensional ranges are illustrative only and can vary depending upon the light engine 12 used and desired lattice 42 designs.

When using the light engine 12A, the sheet thickness can be determined by the properties of the photocurable resin along with a beam cross-sectional geometry, power level, and scan speed of a laser. One advantage of using these sheets is that their cross section through a single horizontal layer is defined by a single pass of a laser while providing a high structural integrity.

Figure 6:
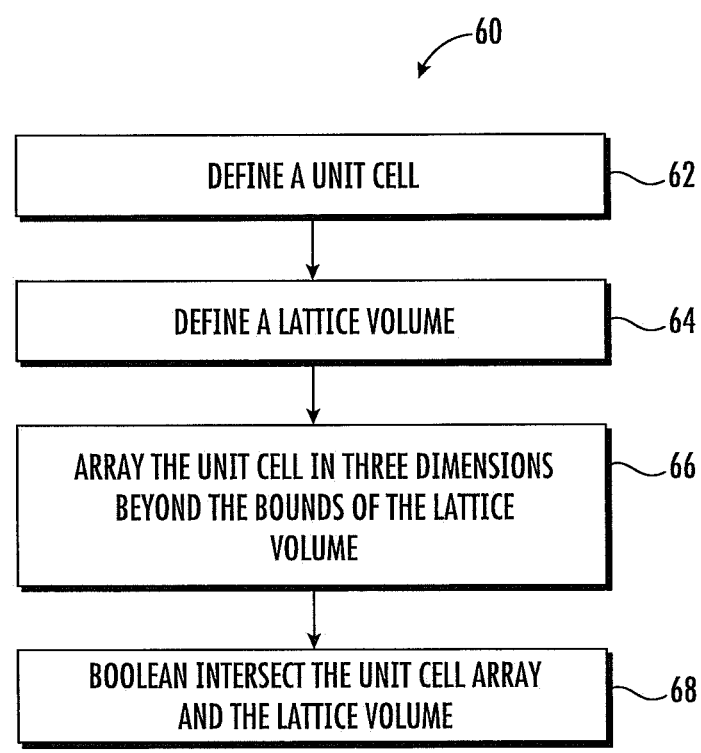
FIG. 6 depicts an embodiment of a method of forming a lattice internal to a shell.

FIG. 6 depicts an embodiment of a method 60 for defining a lattice 42 within a lattice volume 35. A lattice volume 35 can be defined within a single boundary 31 or between two boundaries 31 and 33.

According to 62, a single unit cell 48 is defined. According to 64, a lattice volume 35 is defined. According to 66, the unit cell 48 is arrayed in three dimensions so as to completely fill and extend beyond the lattice volume 35. According to 68, a Boolean intersection between the array of unit cells 48 and the lattice volume 35 defines an array of unit cells 48 that just fill the lattice volume 35. The outer unit cells 48 are typically truncated in order to conform to the boundaries of the lattice volume 35.

Figure 7:
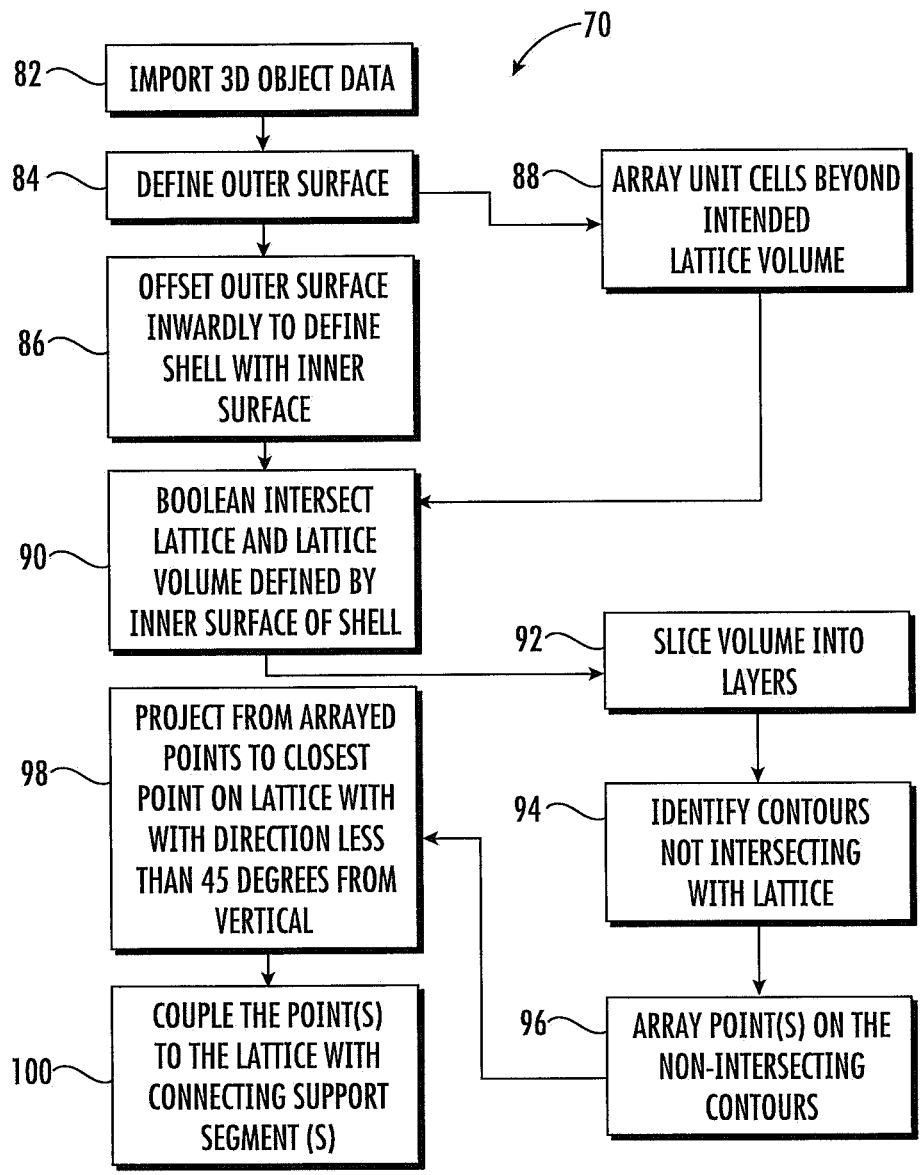
FIG. 7 depicts an embodiment of a method of providing a support for an unsupported portion of a shell.
Figure 8:
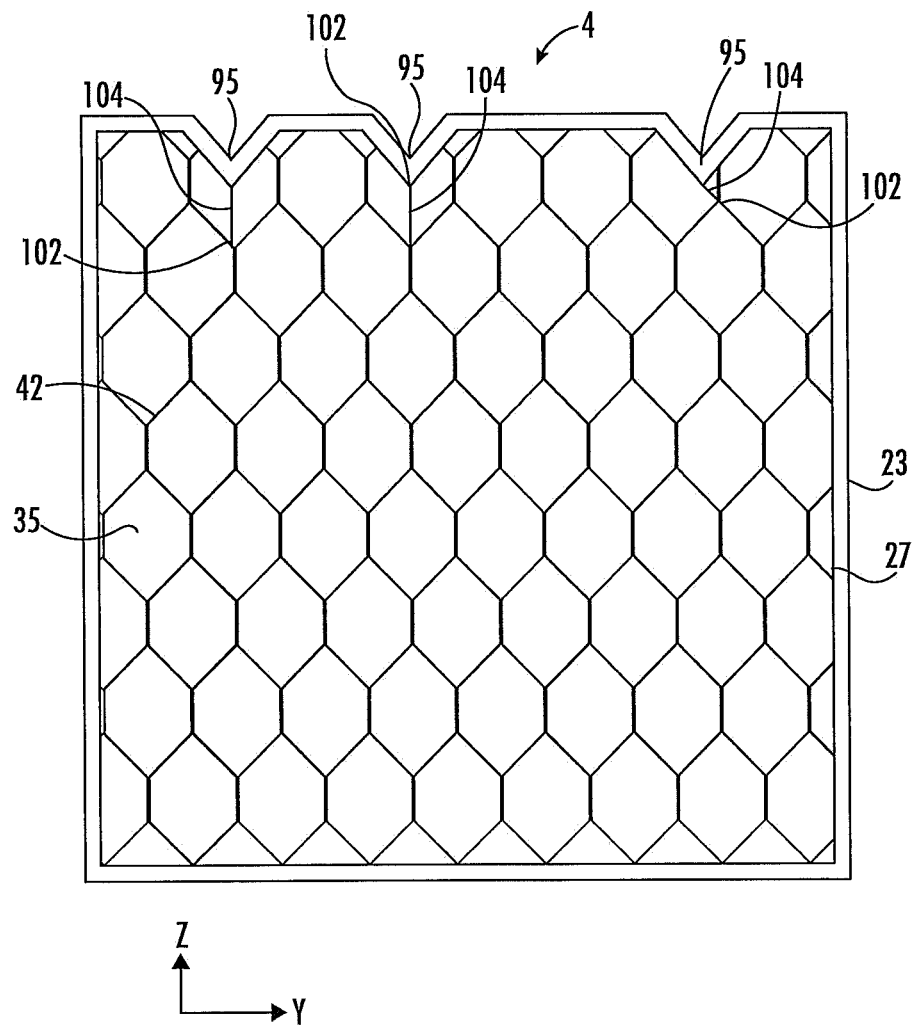
FIG. 8 is a diagram for illustrating an embodiment of the method of FIG. 7.
Figure 8A:
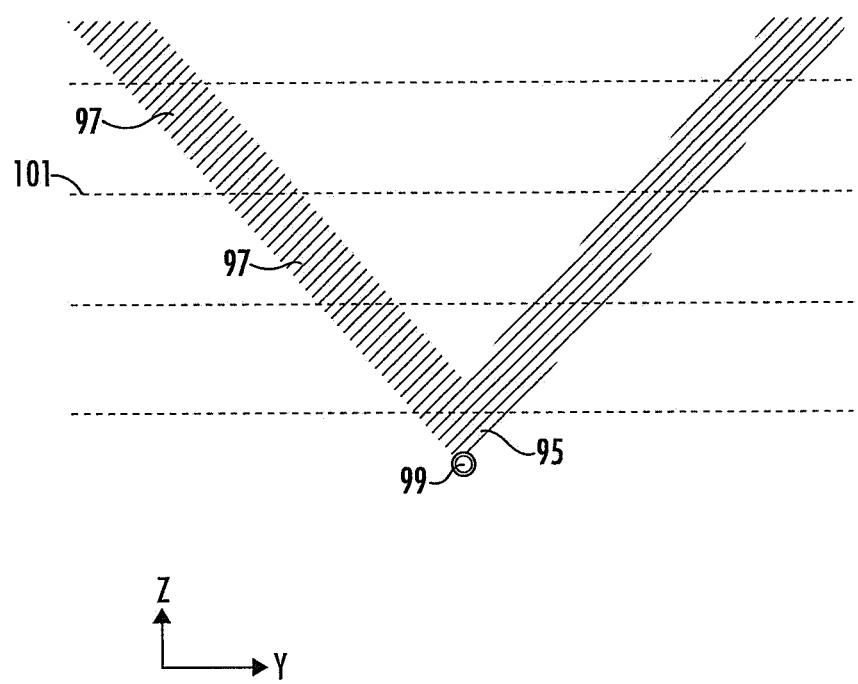
FIG. 8A is a diagram illustrating added detail from FIG. 8.

FIG. 7 depicts a method 70 of providing support for an unsupported portion of the shell 25. FIGS. 8 and 8A depict features of a three-dimensional article 4 that pertain to the method 70. Method 70 also corresponds to steps 36 and 38 of FIG. 2 except that method 70 is a particular embodiment and illustrates greater detail.

According to 82 three-dimensional object data is imported by the controller 15. According to 84, the outer surface 23 of the three-dimensional article 4 is defined based upon the imported object data.

According to 86, the outer surface 23 is offset inwardly to define an inner surface 27 of the shell 25. The inner surface 27 defines the lattice volume 35.

According to 88, unit cells 48 are arrayed in three dimensions to fill and extend beyond the lattice volume 35. According to 90, a Boolean intersection is executed between the arrayed unit cells 48 and the lattice volume 35 to define the lattice 42.

According to 92 and 94, one or more of an unsupported portion 95 of shell 25 is identified. FIG. 8 depicts three such unsupported portions 95. The unsupported portion 95 is shown in more detail in FIG. 8A.

According to 92, the shell is sliced into horizontal "contours" 97 using horizontal slicing planes 101. According to 94, an unsupported contour is 95 is identified that is not coupled to the lattice 42. According to 96, at least one contour point 99 is placed upon the unsupported contour 95.

According to 98, a direction is projected from the contour point 99 to a closest lattice point 102 such that the projection defines a vector trajectory that is within 45 degrees of the vertical axis Z. According to 100, a connecting support segment 104 is defined that couples the contour point 99 to the closest lattice point 102. Three of such support segments 104 are illustrated in FIG. 8.

Generally speaking, an unsupported portion 95 of the shell 25 is any portion of the shell 25 that extends inwardly into the lattice volume 35 and requires some added support. For some printing systems, a tip 95 of a downward extension can require support as is illustrated in FIG. 8.

Figure 9:
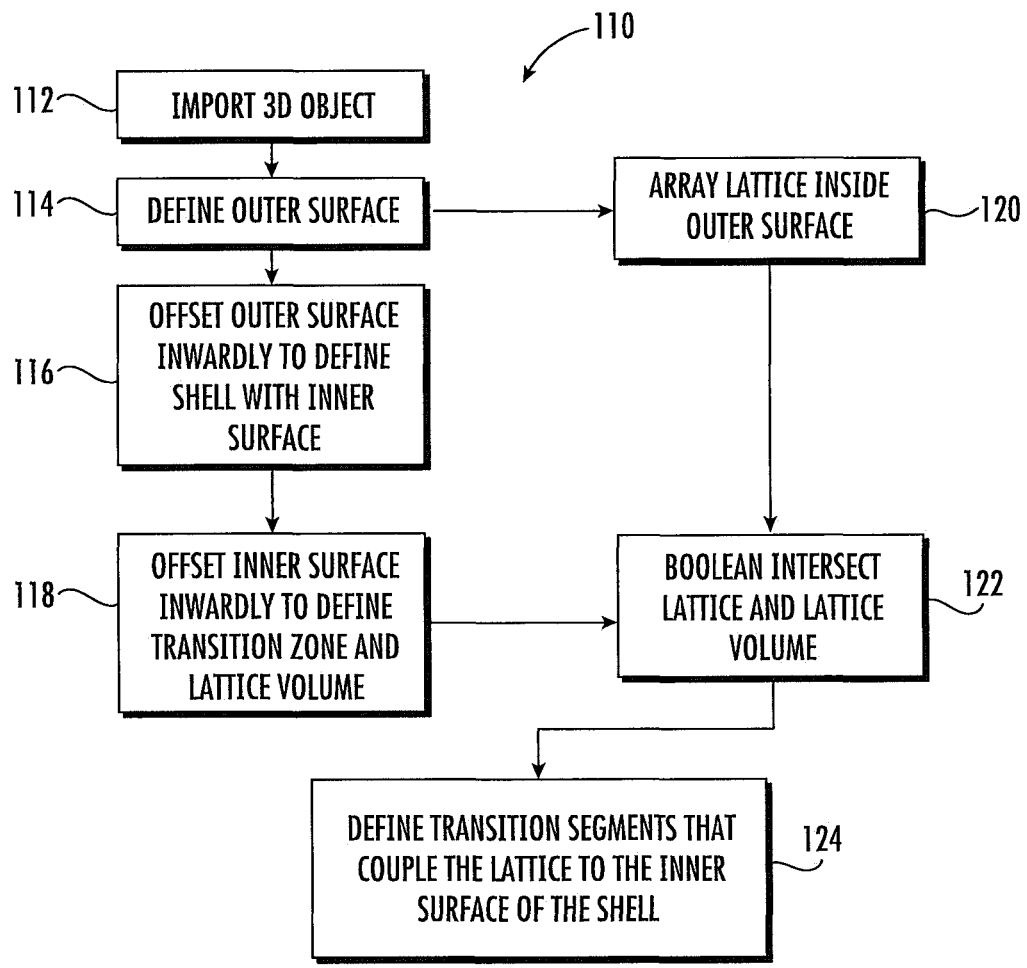
FIG. 9 is a flowchart depicting an embodiment of a method for forming a transition zone between a lattice and a shell.
Figure 10:
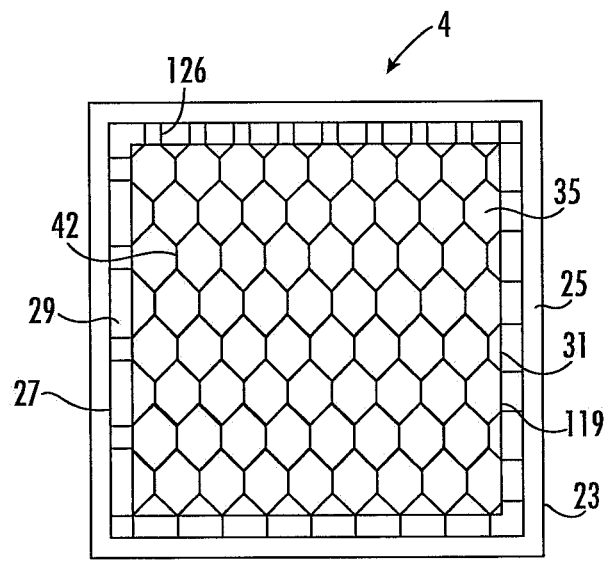
FIG. 10 is a diagram that illustrates an embodiment of an article resulting from the method of FIG. 9.
Figure 11:
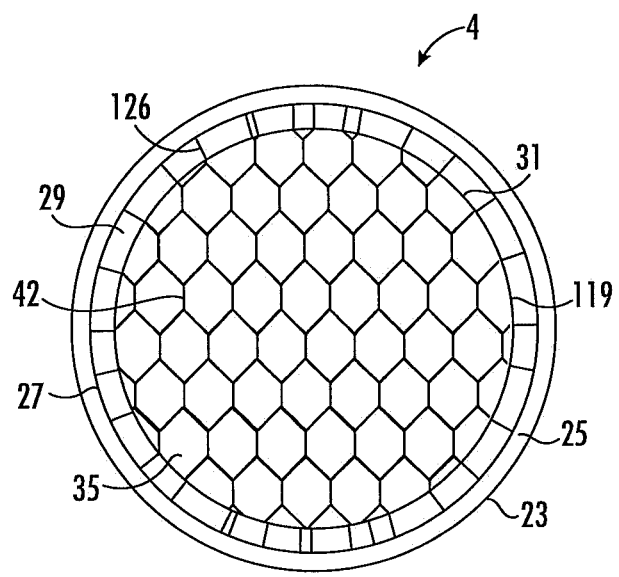
FIG. 11 is a diagram that illustrates an embodiment of an article resulting from the method of FIG. 9.

FIGS. 9-11 depict a method 110 of forming a transition zone 29 between the lattice 42 and the shell 25. FIGS. 9 and 10 depict features of a three-dimensional article that pertain to the method 110. Method 110 also corresponds to steps 22, 24, 26, 30, and 32 of FIG. 2 except that method 110 is a more particular embodiment.

According to 112, three-dimensional object data is imported by the controller 15. According to 114, the outer surface 23 of the three-dimensional article 4 is defined based upon the imported object data.

According to 116 the outer surface 23 is offset inwardly to define an inner surface 27 of the shell 25. According to 118, the inner surface 27 of the shell 25 is displaced inwardly to define a boundary 31 between the transition zone 29 and a lattice volume 35. According to one embodiment, a cage 119 is defined along the boundary 31. The cage 119 is a mesh 119 that defines the boundary surface 31. In one embodiment, the mesh 119 is a surface lattice 119 used to couple segments 50 that are inside and outside of the boundary 31. In an alternative embodiment, there is no mesh 119 defined. In some embodiments, the cage mesh 119 will have a thickness that is about equal to that of the sheets 54 that make up the lattice segments 50. One key advantage of the cage 119 is for coupling to unsupported down-hanging segments 50 for truncated unit cells 48 of the lattice 42.

According to 120, lattice unit cells 48 are arrayed to fill and extend beyond the lattice volume 35. According to 122, a Boolean intersection between the lattice unit cell 48 array and the lattice volume results in the lattice 42.

According to 124, transition segments 126 are defined that couple the lattice 42 to the inner surface 27 of the shell 25. Compared to the segments 50 of the lattice 42, the transition segments 126 are oriented closer to a normal to the inner surface 27 of the shell. In one embodiment, cage 119 couples the lattice 42 segments 50 to the transition segments 126. In an alternative embodiment without the cage 119 the transition segments 126 couples directly to the lattice 42 segments 50.

In the illustrated embodiments of FIGS. 10 and 11, the transition segments 126 are generally normal or perpendicular to the inner surface 27 of the shell 25. This differs from the lattice segments 50 whose orientation is defined by the unit cells 48 of the lattice 42. Having a consistent or perpendicular orientation of the transition segments 126 with respect to surface 27 has two advantages: (1) a consistent support for the shell 25 which will tend to improve dimensional accuracy of the shell 25 including the shell outer surface 23 and (2) facilitate draining of uncured resin from the shell 25.

Using a mesh 119 at the boundary 31 allows the lattice 42 and the transition segments 126 to be independently optimized. That is because intersections between the lattice 42 and the mesh 119 don't need to coincide with intersections between the transition segments 126 and the mesh 119.

Figure 12:
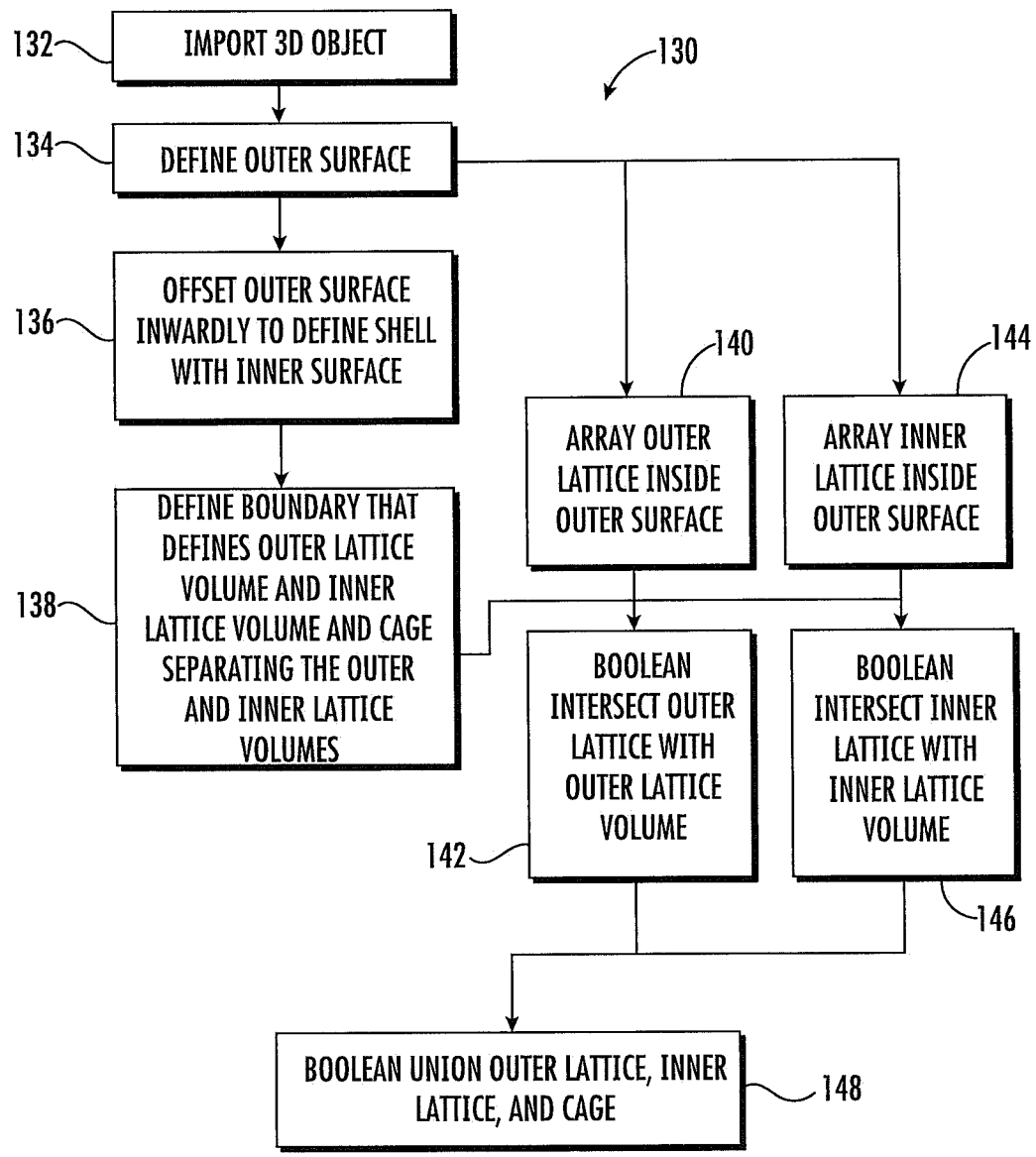
FIG. 12 is a flowchart depicting an embodiment of a method for forming a varying density lattice structure within a shell.
Figure 13:
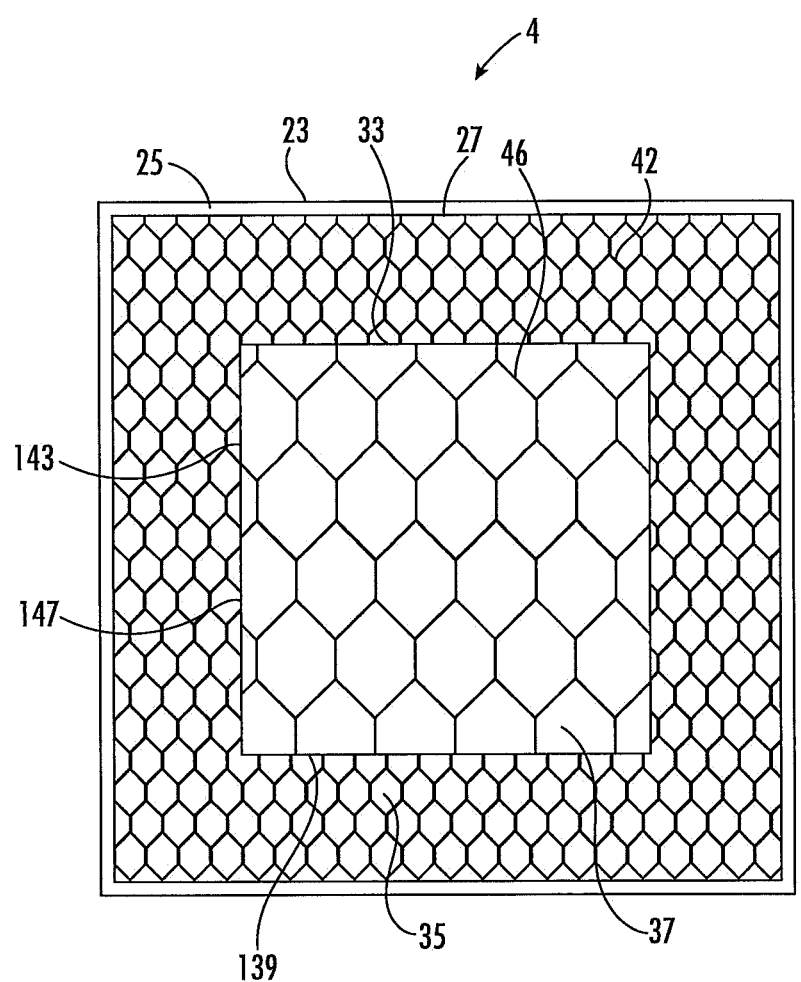
FIG. 13 is a diagram that illustrates an embodiment of an article resulting from the method of FIG. 12.

FIGS. 12 and 13 depict a method 130 of forming two different lattice structures 42 and 46 to fill a hollow shell 25. Lattice 42 is an outer lattice 42 and lattice 46 is an inner lattice 46. Comparing the two, inner lattice 46 requires less material per unit volume than the outer lattice 42. In one embodiment, a unit cell volume for the inner lattice 46 is greater than a unit cell volume for the outer lattice 42. Method 130 also corresponds to steps 22, 24, 28, 30, and 34 of FIG. 2 except that method 130 is a more particular method.

According to 132, three-dimensional object data is imported by the controller 15. According to 134, an outer surface 23 of the three-dimensional article 4 is defined based upon the imported data.

According to 136, the outer surface 23 is offset inwardly to define an inner surface 27 of the shell 25. According to 138, a boundary 33 is defined that separates an outer lattice volume 35 and an inner lattice volume 37. According to an embodiment, a cage 139 is defined along the boundary 33. The cage 139 is a mesh 139 that defines the boundary surface 33. The cage 139 is a surface lattice or mesh 139 that is used to couple the outer lattice 42 to the inner lattice 46.

According to 140, outer lattice unit cells 48 are arrayed to fill and extend beyond the outer lattice volume 35. According to 142, a Boolean intersection between the array of outer lattice unit cells 48 and the outer lattice volume 35 results in the lattice 42.

According to 144, inner lattice unit cells are arrayed to fill and extend beyond the inner lattice volume 37. According to 146, a Boolean intersection between the array of inner lattice unit cells and the inner lattice volume 37 results in the lattice 46. According to 148, a Boolean union is formed between the outer lattice 42, the inner lattice 46, and the cage 139.

Using the cage (mesh) 139 allows connections between the outer lattice 42 and the cage 139 to be independent (non-intersecting with) connections between the inner lattice 46 and the cage 139. Also, the outer lattice 42 defines connection points 143 with the cage 139. The inner lattice 46 defines connection points 147 with the cage 139. Connection points 143 generally do not coincide with connection points 147.

Figure 14:
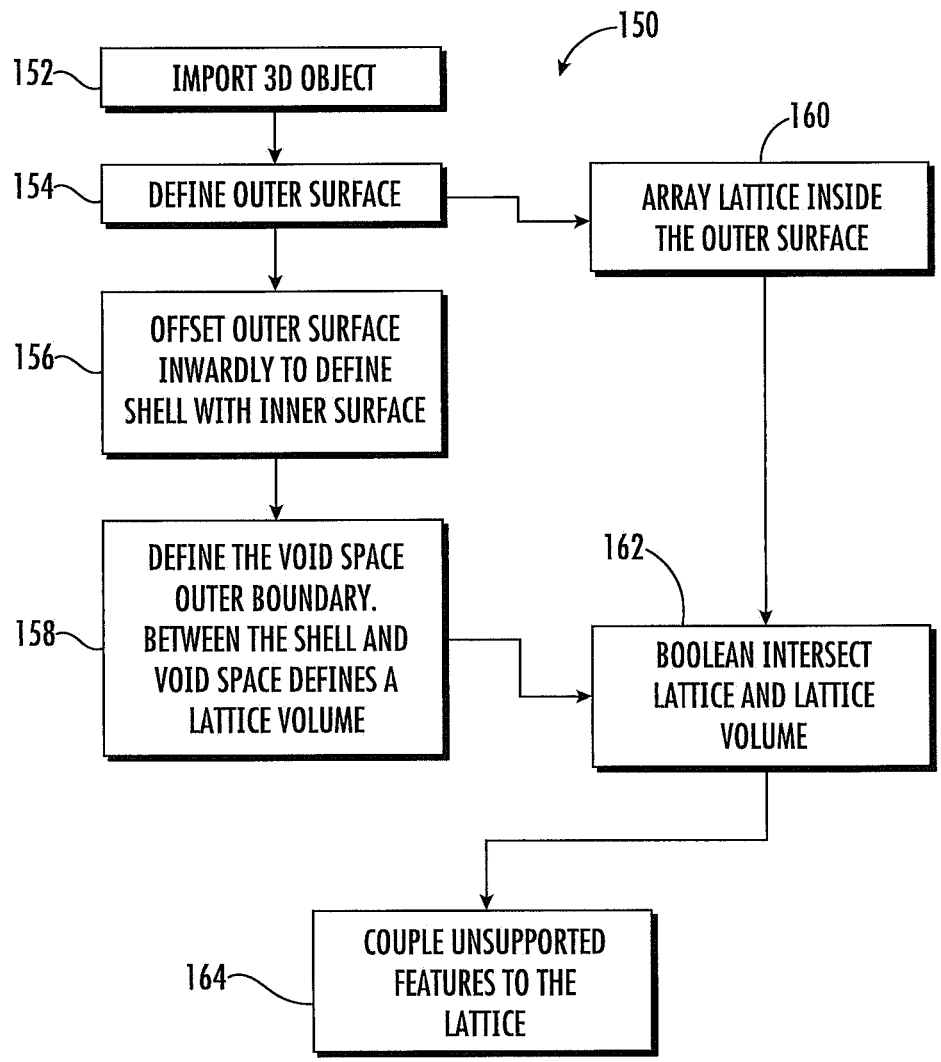
FIG. 14 is a flowchart depicting an embodiment of a method for forming an article with a void inside a lattice.
Figure 15:
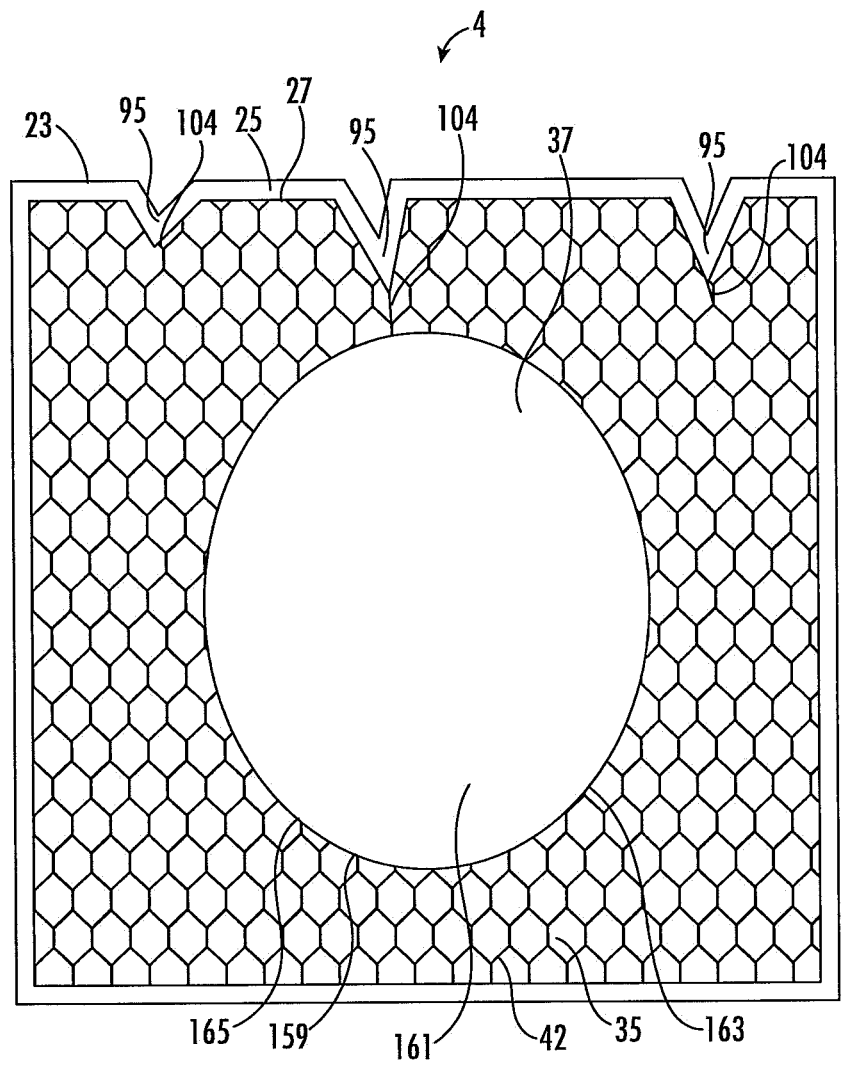
FIG. 15 is a diagram that illustrates an embodiment of an article resulting from the method of FIG. 14.

FIGS. 14 and 15 depict a method 150 of forming a three-dimensional article 4 with an internal lattice 42 and an inner volume 37 that is a void 161. According to 152, three-dimensional object data is imported by the controller 15. According to 154, an outer surface 23 of the three-dimensional article 4 is defined based upon the imported data.

According to 156, the outer surface 23 is offset inwardly to define an inner surface 27 of the shell 25. According to 158 a void space outer boundary 159 is defined that defines an inner void 161 and the lattice volume 35. According to an embodiment, a cage 163 is defined along the outer boundary 159. The cage 163 is a mesh that defines the boundary surface 159. The cage 163 is a mesh 163 that is used to couple truncated end points 165 of the lattice 42 (that are truncated by the void 161).

One preferable shape for the outer boundary 159 is a prolate ellipsoid whose major axis is aligned with the vertical. Even better shapes from a printing standpoint is a teardrop shape or a shape with a conical top and a conical bottom.

According to 160 lattice unit cells 48 are arrayed to fill and extend beyond the lattice volume 35. According to 162, a Boolean intersection between the array of lattice unit cells 48 and the lattice volume 35 results in the lattice 42.

According to 164, support segments 104 are defined to couple unsupported portions 95 of the shell 25 to the lattice 42. The support segments 104 can be defined in a manner similar to that described with respect to FIG. 15.

Figure 16:
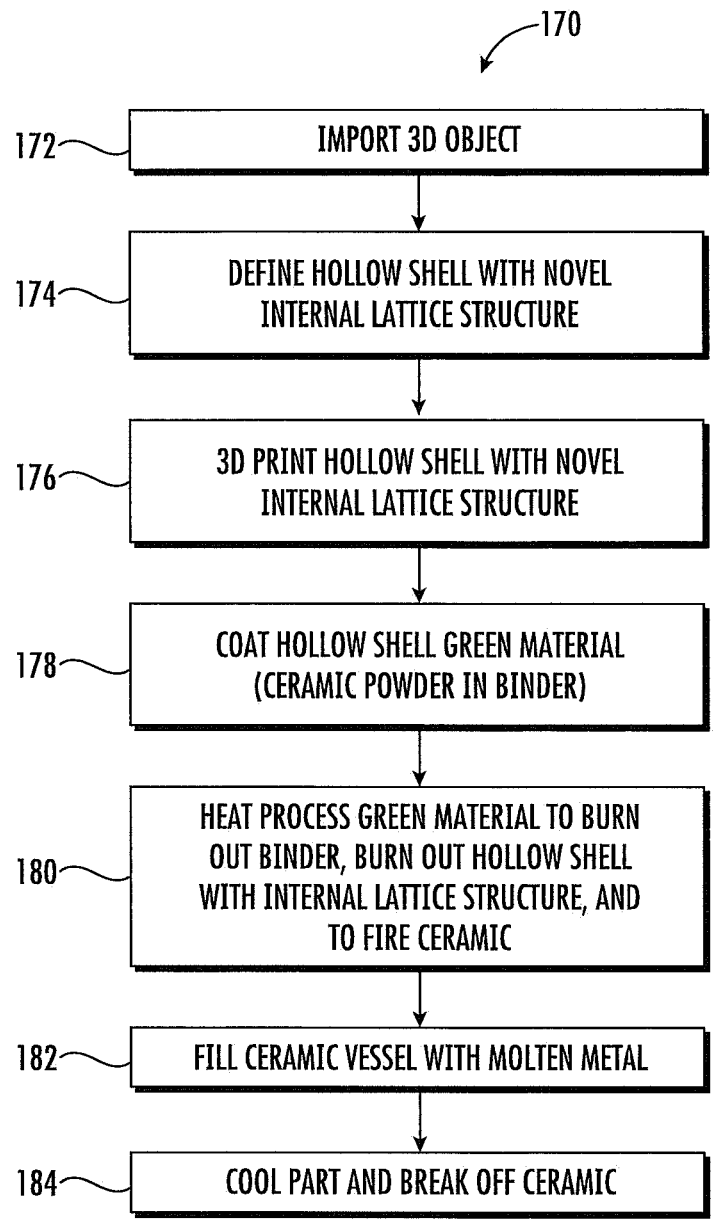
FIG. 16 is a flowchart depicting a method of forming a metal article.

FIG. 16 depicts a method 170 for manufacturing a metal article. This method can incorporate any of the methods discussed earlier with respect to FIGS. 1-15.

According to 172, controller 15 imports a file defining a three-dimensional metal article to be fabricated. According to 174, the imported file is processed to define a precursory article 4 including a shell 25 with a novel internal lattice structure. Step 174 can incorporate any of the methods described with respect to FIGS. 2-15.

According to 176, a three-dimensional printing system 2 prints the article 4 which is a precursory article having an outer surface 23. Two exemplary alternative processes for printing precursory article 4 were described with respect to FIG. 2. The precursory article 4 is typically formed from an organic resin that has been cured with radiation. As part of step 176, uncured resin is drained from the precursory article 4.

According to 178, the article 4 is coated with a "green" material. The green material can include a mixture of a ceramic powder dispersed in an organic binder. According to 180, the green material is subjected to a heating process that burns out the binder, burns out precursory article 4, and fires the ceramic to form a ceramic vessel. The heating process 180 can include a first temperature profile which burns out all organic materials including the binder and the precursory article 4. The heating process 180 can include a second temperature profile which fires and sinters the ceramic material.

According to 182, the ceramic vessel is at least partially filled with molten metal. According to 184, the vessel and metal are cooled and the ceramic is cracked and removed from the resultant solidified metal article. The methods described supra have a number of advantages for forming the metal article.

Method 60:

Method 60 described the formation of lattice 42. The lattice 42 is formed from segments 50 which are in turned formed from intersecting sheets 54 as illustrated in FIGS. 4 and 4A. This segment 50 geometry provides a great deal of strength of the lattice 42 with a minimum amount of polymeric material. The strength provides excellent structural support for the shell 25 which in turn is effective in supporting the ceramic material. This assures a good dimensional accuracy for an outer surface of the resultant metal article. At the same time, minimizing an amount of polymer used reduces cost and an amount of polymer that must be burned out during step 180.

Method 70:

Method 70 described coupling unsupported portions of the shell 25. This method improves a dimensional accuracy of the resultant cast metal article by improving a dimensional accuracy of the shell 25.

Method 110:

Method 110 described transition segments between the lattice 42 and the shell 25. This provides a consistent support for the shell 25 which in turn improves a dimensional accuracy of the shell 25 and further for the cast metal article. The transition segments also improve draining of resin during step 176. Trapped uncured resin can cause damage to the ceramic during step 180.

Method 130 or 150:

These methods allow sufficient support for the shell 25 (and therefore dimensional accuracy) while minimizing an amount of resin used. This reduces a cost of forming the precursory article 4 and reduces an amount of polymer that must be burned out in step 180.

Method 20:

The overall method 20 can incorporate any or all of the improvements of methods 60, 70, 110, 130, and/or 150. Therefore, the some or all of the advantages of the methods can be realized with the overall method 20.

The specific embodiments and applications thereof described above are for illustrative purposes only and do not preclude modifications and variations encompassed by the scope of the following claims.

What is claimed:

1. An apparatus for manufacturing a three-dimensional article formed by additive manufacturing, the apparatus comprising a processor and a memory for storing executable instructions that in response to execution by the processor cause the apparatus to at least:

receive initial data defining the three-dimensional article having an outer surface;

define a shell having the outer surface of the three-dimensional article and an opposing inner surface that defines an inner cavity;

define a transition zone between the inner surface of the shell and a boundary that is inside the inner cavity and generally follows the inner surface of the shell;

define a lattice of arrayed unit cells that fill the inside of the boundary, the lattice is defined by connected lattice segments;

define transition segments that couple the lattice to the inner surface of the shell, the transition segments are generally oriented more toward a normal to the inner surface of the shell relative to the lattice segments; and define a mesh cage at the boundary between the transition zone and the lattice, the mesh cage couples to the lattice and to the transition segments.

2. The apparatus of claim 1 wherein defining the shell includes offsetting the outer surface of the shell inwardly to define the inner surface of the shell.

3. The apparatus of claim 1 wherein the unit cells are individually one of cubic, hexagonal, rhombohedral, triclinic, monoclinic, tetrahedral, and shortened tetrahedral.

4. The apparatus of claim 1 wherein the lattice segments are individually defined by a pair of intersecting sheets.

5. The apparatus of claim 1 wherein the transition segments directly couple to the lattice.

6. The apparatus of claim 1, further comprising identifying an unsupported contour and then defining a transition segment to couple the unsupported contour to the lattice.

7. A computer-readable storage medium for defining a supported shell for manufacturing a three-dimensional article by additive manufacturing, the computer-readable storage medium being non-transitory and having computer-readable program code portions stored therein that in response to execution by a processor cause an apparatus to at least:

receive initial data defining the three-dimensional article having an outer surface;

define a shell having the outer surface of the three-dimensional article and an opposing inner surface that defines an inner cavity;

define a transition zone between the inner surface of the shell and a boundary that is inside the inner cavity and generally follows the inner surface of the shell;

define a lattice of arrayed unit cells that fill the inside of the boundary, the lattice is defined by connected lattice segments;

define transition segments that couple the lattice to the inner surface of the shell, the transition segments are generally oriented more toward a normal to the inner surface of the shell relative to the lattice segments; and define a mesh cage at the boundary between the transition zone and the lattice, the mesh cage couples to the lattice and to the transition segments.

8. The computer-readable storage medium of claim 7 wherein defining the shell includes offsetting the outer surface of the shell inwardly to define the inner surface of the shell.

9. The computer-readable storage medium of claim 8 wherein the unit cells are individually one of cubic, hexagonal, rhombohedral, triclinic, monoclinic, tetrahedral, and shortened tetrahedral.

10. The computer-readable storage medium of claim 8 wherein the lattice segments are individually defined by a pair of crossed sheets.

11. The computer-readable storage medium of claim 8 wherein the transition segments directly couple to the lattice.

12. The computer-readable storage medium of claim 8 further comprising identifying an unsupported contour and then defining a transition segment to couple the unsupported contour to the lattice.

\* \* \* \* \*